US012750337B2

(12) United States Patent
Hart et al.

(10) Patent No.: US 12,750,337 B2
(45) **Date of Patent: *Sep. 29, 2026**

(54) NETWORK THAT HANDLES CONFLICTING LOCALLY ADMINISTERED ADDRESSES

(71) Applicant: Cisco Technology, Inc., San Jose, CA (US)

(72) Inventors: Brian D. Hart, Sunnyvale, CA (US); Stephen M. Orr, Wallkill, NY (US); Venkataprasad Chirreddy, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 13 days.

This patent is subject to a terminal disclaimer.

(21) Appl. No.: 18/771,823

(22) Filed: Jul. 12, 2024

(65) Prior Publication Data

US 2024/0372828 A1 Nov. 7, 2024

Related U.S. Application Data

(63) Continuation of application No. 18/305,105, filed on Apr. 21, 2023, now Pat. No. 12,081,515.

(51) Int. Cl.
*H04L 61/5092* (2022.01)
*H04L 61/5038* (2022.01)
(Continued)

(52) U.S. Cl.
CPC ...... *H04L 61/5092* (2022.05); *H04L 61/5038* (2022.05); *H04L 61/5046* (2022.05); *H04L 2101/622* (2022.05)

(58) Field of Classification Search
CPC . H04L 61/50; H04L 61/5038; H04L 61/5046; H04L 61/5061; H04L 61/5076;
(Continued)

(56) References Cited

U.S. PATENT DOCUMENTS 7,529,851 B1 * 5/2009 Haley ................. H04L 61/5046 709/224
2003/0177267 A1 * 9/2003 Orava ................. H04L 61/5046 709/245

(Continued)

OTHER PUBLICATIONS

International Search Report and Written Opinion for International Application No. PCT/US2024/024564, mailed Aug. 12, 2024, 19 Pages.

*Primary Examiner* — Vivek Srivastava
*Assistant Examiner* — William C Mcbeth
(74) *Attorney, Agent, or Firm* — Patterson + Sheridan, LLP

(57) ABSTRACT

The present disclosure describes a system and method for deconflicting locally administered medium access control addresses (LAMAs). An apparatus includes a memory and a processor communicatively coupled to the memory. The processor receives a request for a client device to use a locally administered medium access control address (LAMA) and determines that the LAMA is in use or reserved for future use by an access point that is out of range of the client device. Prior to the client device roaming to the access point, the processor transmits to the client device a message denying connectivity to the client device using the LAMA. The message indicates a LAMA that the client device is prohibited from selecting.

14 Claims, 5 Drawing Sheets

(51) Int. Cl.
*H04L 61/5046* (2022.01)
*H04L 101/622* (2022.01)

(58) Field of Classification Search
CPC ......... H04L 61/5092; H04L 2101/622; H04W 8/26; H04W 12/02; H04W 84/12
See application file for complete search history.

(56) References Cited

U.S. PATENT DOCUMENTS

| | | | | |
|---|---|---|---|---|
| 2018/0077111 | A1* | 3/2018 | Pang | H04L 61/5038 |
| 2018/0077742 | A1* | 3/2018 | Pang | H04L 61/5046 |
| 2020/0213270 | A1* | 7/2020 | Wentink | H04L 61/5046 |
| 2022/0377042 | A1* | 11/2022 | Henry | H04L 61/5092 |
| 2023/0089319 | A1* | 3/2023 | Kneckt | H04W 12/02 370/328 |
| 2023/0269220 | A1* | 8/2023 | de la Oliva | H04L 61/5038 370/312 |

* cited by examiner

NETWORK THAT HANDLES CONFLICTING LOCALLY ADMINISTERED ADDRESSES

CROSS-REFERENCE TO RELATED APPLICATIONS

This application is a continuation of co-pending U.S. patent application Ser. No. 18/305,105 filed Apr. 21, 2023. The aforementioned related patent application is herein incorporated by reference in its entirety.

TECHNICAL FIELD

Embodiments presented in this disclosure generally relate to network communications. More specifically, embodiments disclosed herein relate to a network that handles conflicting locally administered addresses.

BACKGROUND

Network devices may use medium access control (MAC) addresses to communicate on a network. Unique MAC addresses are typically assigned to devices during manufacturing.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
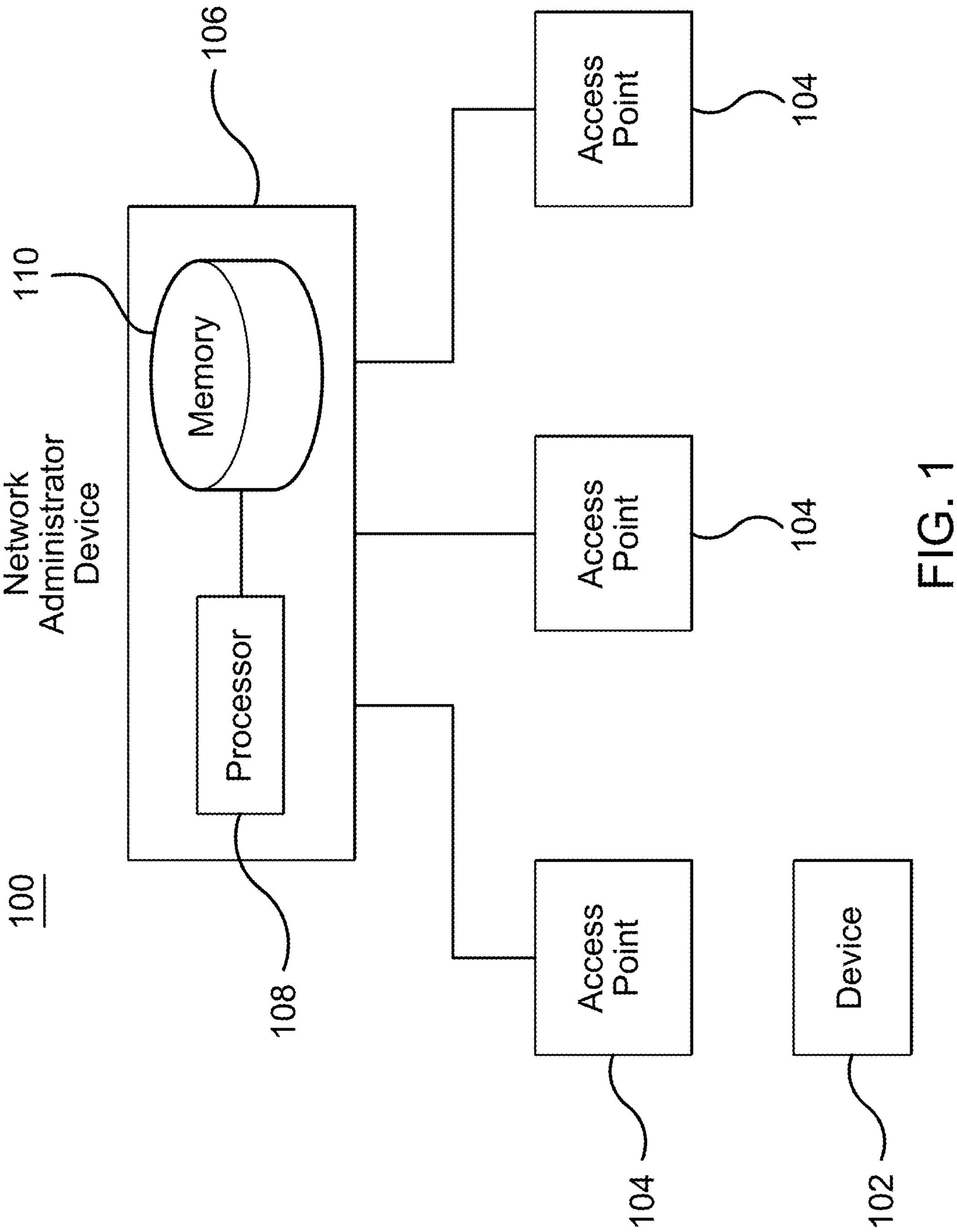
FIG. 1 illustrates an example system.

The present disclosure describes a system and method for deconflicting locally administered medium access control (MAC) addresses (LAMAs). According to an embodiment, an apparatus includes a memory and a processor communicatively coupled to the memory. The processor receives a request for a client device to use a LAMA and determines that the LAMA is in use or reserved for future use by a first access point. The processor also transmits to the client device a message denying connectivity to the client device using the LAMA instructing the client device to refrain from communicating using the LAMA.

According to another embodiment, a method includes receiving a request for a client device to use a LAMA and determining that the LAMA is in use or reserved for future use by a first access point. The method also includes transmitting to the client device a message denying connectivity to the client device using the LAMA.

According to another embodiment, an apparatus includes a memory and a processor communicatively coupled to the memory. The processor, in response to determining that a client device is using a first LAMA that is in use or reserved for future use by a first access point that is out of range of the client device, assigns, to the client device a second LAMA different from the first LAMA and establishes, with the client device, a key for the second LAMA such that the client device transitions to the second LAMA when the client device provides the key to a second access point.

Example Embodiments

Unique medium access control (MAC) addresses are typically assigned to devices during manufacturing. Over time, not only has the number of manufactured devices grown, but so has the rate at which these devices are manufactured. As a result, there is a concern that the pool of available MAC addresses will be exhausted. One way to address this concern is to allow devices to use locally administered MAC addresses (LAMAs). Under existing implementations, devices may select a LAMA to use when connected to a network. Conflicts may occur, however, if a device selects a LAMA that is already being used by another device on the network (i.e., an actual conflict) or that is being reserved for future use by the network (i.e., a potential conflict).

The present disclosure describes a system and method for handling LAMA conflicts in a network (e.g., a wireless fidelity (WiFi) network). The system may include a network administrator device that determines when a client device is using or requests to use a LAMA that creates a conflict. For example, the system may determine when the LAMA is already in use or is reserved to be used in the future. When a conflict arises, the network administrator device may instruct the client device to select a different LAMA. For example, the network administrator device may deny connectivity without a reason, deny connectivity with the bare reason that a conflict exists, or indicate to the client device that a conflict exists and provide to the client device (i) a range (or a set of ranges) of LAMAs to avoid when selecting a new LAMA and/or (ii) a LAMA or range or a set of ranges of LAMAs to choose from when selecting the new LAMA. The client device may then select the new LAMA that will avoid the conflict.

The network administrator device may detect that a LAMA conflict may arise between the client device and an access point in the network that may be unknown to the client device (e.g., because the access point is out of range of the client device, or due to incomplete scanning by the client device, collisions occurring during scanning, or client mobility such that recent scans become stale). Instead of denying association without a reason or without an insightful reason, the network administrator device may prospectively handle this conflict by instructing the client device to select a new LAMA before the client device moves or roams to the access point. The network administrator device may even recommend to the client device one or more ranges of LAMAs to avoid because those range(s) of LAMAs are in use or reserved for future use by the network. In some embodiments, if the client device is using a roaming or transition protocol that allows the client device to keep its selected LAMA while moving or roaming between access points (e.g., the 802.11r Fast Transition (FT) protocol), then the network administrator device may have the client device (i) select a new LAMA that avoids potential conflicts with out-of-range access points, (ii) establish key(s) for using the new LAMA, and (iii) use that LAMA and key(s) when moving or roaming to another access point. In this manner, the client device may change LAMA and key(s) when moving or roaming to other access points.

In certain embodiments, the network administrator device provides several technical advantages. For example, the network administrator device may reduce the number of LAMA conflicts that occur in a network. As another example, the network administrator device may allow client devices to keep using selected LAMAs as the client devices move and roam in the network.

FIG. 1 illustrates an example system 100. As seen in FIG. 1, the system 100 includes a device 102, one or more access points 104, and a network administrator device 106. Generally, the network administrator device 106 detects LAMA conflicts in the system 100. The network administrator device 106 may also provide LAMAs that may be chosen or should be avoided in the system 100. In this manner, the network administrator device 106 handles LAMA conflicts in the system 100.

The device 102 (which may also be referred to as a client device) may connect to one or more access points 104 to receive network access. The device 102 may connect to different access points 104 as the device 102 moves throughout the system 100. For example, the device 102 may connect to the access point 104 that is physically closest to the device 102 as the device 102 moves throughout the system 100. The device 102 may use a LAMA while connected to an access point 104. When the device 102 attempts to connect to an access point 104, the device 102 may select a LAMA to use. The network administrator device 106 may analyze the LAMA to determine whether that LAMA will cause a conflict in the system 100. For example, the network administrator device 106 may determine whether the LAMA is in use or reserved for future use by one or more of the access points 104. If the LAMA will not cause a conflict, then the device 102 may be allowed to use the LAMA for its connection to the network. If the LAMA will result in a conflict, then the network administrator device 106 may deny connectivity to the device 102 or instruct the device 102 to select a different LAMA. The network administrator device 106 may also provide the device 102 one or more LAMAs to use or one or more LAMAs to avoid. The device 102 may then select a LAMA according to the instructions from the network administrator device 106.

The device 102 is any suitable device for communicating with components of the system 100. As an example and not by way of limitation, the device 102 may be a computer, a laptop, a wireless or cellular telephone, an electronic notebook, a personal digital assistant, a tablet, or any other device capable of receiving, processing, storing, or communicating information with other components of the system 100. The device 102 may be a wearable device such as a virtual reality or augmented reality headset, a smart watch, or smart glasses. The device 102 may also include a user interface, such as a display, a microphone, keypad, or other appropriate terminal equipment usable by the user. The device 102 may include a hardware processor, memory, or circuitry configured to perform any of the functions or actions of the device 102 described herein. For example, a software application designed using software code may be stored in the memory and executed by the processor to perform the functions of the device 102.

The access points 104 facilitate wireless communication in the system 100. One or more devices 102 may connect to an access point 104. The access point 104 may then facilitate wireless communication for the connected devices 102. For example, the access point 104 may transmit messages to a connected device 102. As another example, the access point 104 may receive messages transmitted by the device 102. The access point 104 may then direct that message towards its intended destination. The access point 104 may allow the device 102 to use a LAMA while connected to the access point 104. Additionally, an access point 104 may reserve certain LAMAs for future use (e.g., so that connected devices 102 cannot use those LAMAs or so that the access point 104 may start a new basic service set with the LAMAs). In certain embodiments, if the network administrator device 106 determines that the device 102 is not allowed to use the requested LAMA 204 (e.g., because the requested LAMA 204 is in use or reserved for future use), the access point 104 to which the device 102 is attempting to connect or associate may reject the connection or association from the device 102.

The network administrator device 106 may control or administer other components of the system 100 (e.g., the access points 104). For example, the network administrator device 106 may facilitate LAMA assignment in the system 100. In some embodiments, the network administrator device 106 is a separate device from the access points 104. In certain embodiments, the network administrator device 106 is embodied in one or more of the access points 104. As seen in FIG. 1, the network administrator device 106 includes a processor 108 and a memory 110 that perform the functions or actions of the network administrator device 106 described herein.

The processor 108 is any electronic circuitry, including, but not limited to one or a combination of microprocessors, microcontrollers, application specific integrated circuits (ASIC), application specific instruction set processor (ASIP), and/or state machines, that communicatively couples to memory 110 and controls the operation of the network administrator device 106. The processor 108 may be 8-bit, 16-bit, 32-bit, 64-bit or of any other suitable architecture. The processor 108 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 108 may include other hardware that operates software to control and process information. The processor 108 executes software stored on the memory 110 to perform any of the functions described herein. The processor 108 controls the operation and administration of the network administrator device 106 by processing information (e.g., information received from the devices 102, access points 104, and memory 110). The processor 108 is not limited to a single processing device and may encompass multiple processing devices.

The memory 110 may store, either permanently or temporarily, data, operational software, or other information for the processor 108. The memory 110 may include any one or a combination of volatile or non-volatile local or remote devices suitable for storing information. For example, the memory 110 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 110, a disk, a CD, or a flash drive. In particular embodiments, the software may include an application executable by the processor 108 to perform one or more of the functions described herein.

When the device 102 requests to use a particular LAMA, the network administrator device 106 may receive the request. The network administrator device 106 may determine whether the requested LAMA is being used in the system 100 or is reserved for future use in the system 100 (e.g., by one or more access points 104). For example, the network administrator device 106 may determine whether the device 102 or an access point 104 in the system 100 is already using the requested LAMA. As another example, the network administrator device 106 may determine whether an access point 104 in the system 100 has reserved the LAMA for future use. If the requested LAMA is in use, or is reserved for future use, the network administrator device 106 may determine that a LAMA conflict may occur if the device 102 is allowed to use the requested LAMA. In response, the network administrator device 106 may deny connectivity to the device 12 and/or request that the device 102 select a different LAMA. The network administrator device 106 may also provide the device 102 one or more LAMAs that may be used or one or more LAMAs that should be avoided. The device 102 may use the information from the network administrator device 106 to select a LAMA that is allowed for use. In this manner, the network administrator device 106 may prevent LAMA conflicts from arising in the system 100.

In some embodiments, the network administrator device 106 may determine when a requested LAMA will cause a LAMA conflict with an access point 104 that is out of range of the device 102. For example, the access point 104 may be in a separate area of the system 100, and the device 102 may not be currently connected to that access point 104. If that access point 104 is using or has reserved, for future use, the requested LAMA, then the network administrator device 106 may determine that a LAMA conflict will arise if the device 102 is allowed to use the requested LAMA and the device 102 then roams to the access point 104. For example, the device 102 may roam to the access point 104 using any Fast Transition (FT) protocol or key caching protocol, which allows the device 102 to keep its LAMA as the device 102 roams to different access points 104. To avoid the LAMA conflict, the network administrator device 106 may instruct the device 102 to select a different LAMA. The device 102 may select a LAMA according to the instructions of the network administrator device 106. The device 102 may then establish keys for the LAMA with the access point 104 to which the device 102 is connected or with the network administrator device 106 (e.g., using a four-way handshake). The device 102 may maintain its original LAMA (e.g., the LAMA that may cause a conflict) until the device 102 roams to another access point 104. The device 102 may switch to the new LAMA using the established keys when the device 102 first roams to another access point 104, or later, such as when the device 102 roams to another access point 104 in the same vicinity as the access point 104 that causes the LAMA conflict. When the device 102 subsequently roams to other access points 104 in the system 100, the device 102 may use the established keys to continue using the new LAMA.

Figure 2:
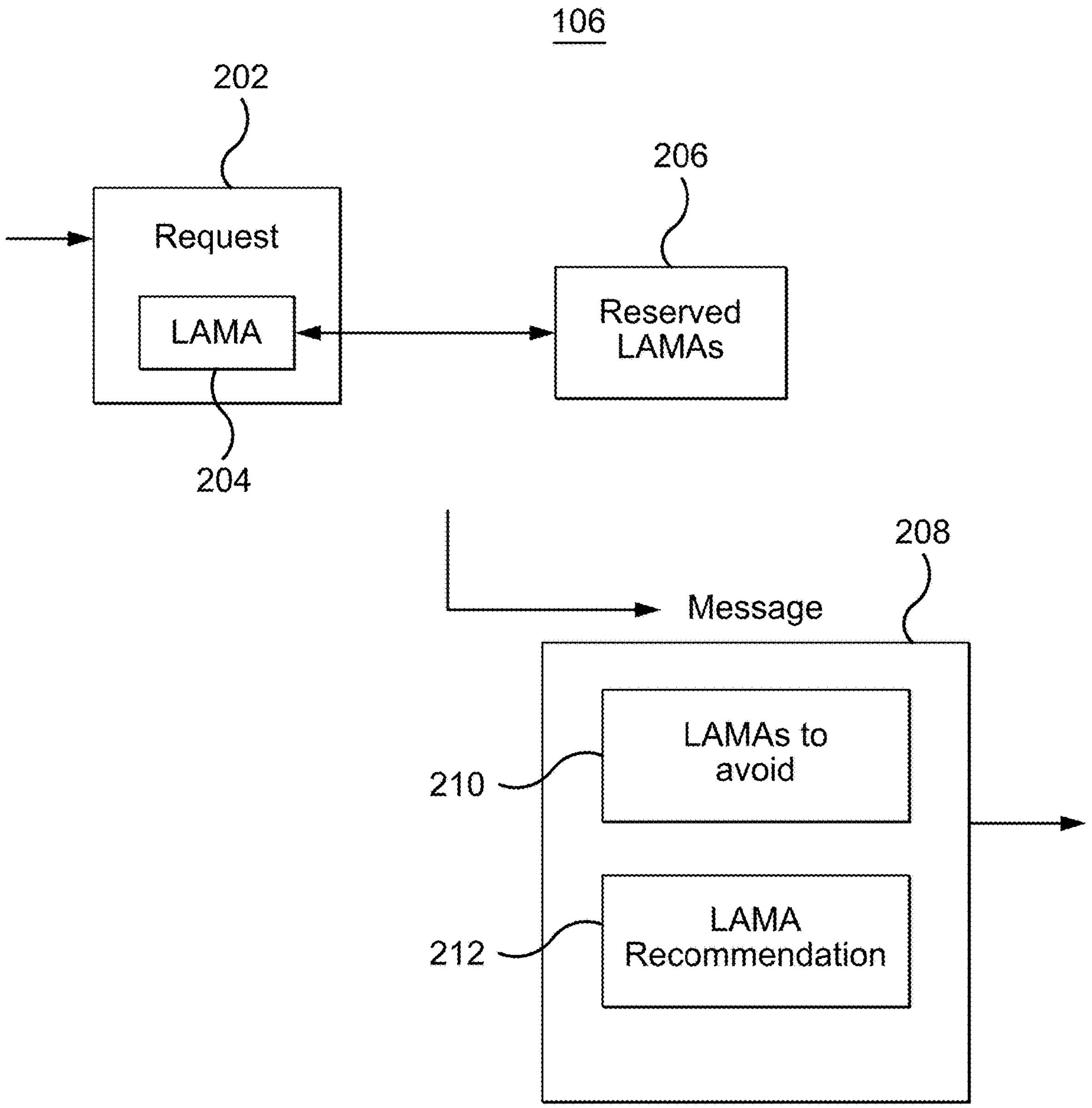
FIG. 2 illustrates an example network administrator device in the system of FIG. 1.

FIG. 2 illustrates an example at network administrator device 106 in the system 100 of FIG. 1. As seen in FIG. 2, the network administrator device 106 receives a request 202 from a device 102 in the system 100. The device 102 may have send the request 202 when the device 102 attempts to connect or associate with an access point 104 in the system 100. The request 202 may include a LAMA 204 that the device 102 is requesting or expecting to use. In some embodiments, the device 102 does not wait for permission before using the LAMA 204 in the request 202. As a result, the request 202 operates more like a signal that the device 102 expects to use or will begin using the LAMA 204. The device 102 may stop using the LAMA 204 if the network administrator device 106 subsequently instructs the device 102 to use a different LAMA. It is understood that the device 102 may request multiple LAMAs 204. The network administrator device 106 may evaluate each LAMA in turn or collectively. In some embodiments, the network administrator device 106 may reject all the LAMAs 204 in the request 202 if one of the LAMAs 204 would cause a conflict or potential conflict.

The network administrator device 106 may compare the LAMA 204 in the request 202 with a set 206 of reserved LAMAs. The set 206 of reserved LAMAs may include LAMAs that are already in use in the system 100 (e.g., by another device 102) or LAMAs that are reserved for future by other components in the system 100 (e.g., access points 104). For example, the network administrator device 106 may determine that the LAMA 204 is already in use or reserved for future by an access point 104 that is in range of the device 102 (but may not be the access point 104 to which the device 102 is attempting to connect), which indicates that the device 102 may cause a conflict if the device 102 connects to the access point 104. If the network administrator device 106 determines that the LAMA 204 appears in the set 206 of reserved LAMAs, then the network administrator device 106 may determine that a conflict will arise if the device 102 is allowed to use the LAMA 204. If the LAMA 204 does not appear in the set 206 of reserved LAMAs, then the network administrator device 106 may determine that the device 102 is allowed to use the LAMA 204.

In some embodiments, the access points 104 in the system 100 may communicate updates about LAMAs in use or reserved for future use to the network administrator device 106. The network administrator device 106 may then update the set 206 of reserved LAMAs. For example, when a device 102 connects to an access point 104 and is using an allowed LAMA, the access point 104 may update the network administrator device 106 that the LAMA is now in use. The network administrator device 106 may then add the LAMA to the set 206 of reserved LAMAs. When the device 102 disconnects from the access point 104 or leaves the system 100, the access point 104 may update the network administrator device 106 that the LAMA is no longer in use. The network administrator device 106 may then remove the LAMA from the set 206 of reserved LAMAs. As another example, when an access point 104 joins the network (e.g., is powered on), the access point 104 may update the network administrator device 106 of the LAMAs that the access point 104 is reserving for future use. The network administrator device 106 may then add these LAMAs to the set 206 of reserved LAMAs. When the access point 104 releases a LAMA, the access point 104 may update the network administrator device 106 that the LAMA is no longer reserved for future use. The network administrator device 106 may then remove the LAMA from the set 206 of reserved LAMAs.

The network administrator device 106 generates and communicates a message 208 to the device 102 to inform the device 102 about whether the device 102 is allowed to use the LAMA 204. If the device 102 is allowed to use the LAMA 204, then the message 208 will indicate that the device 102 may use the LAMA 204. The indication might span more than just the LAMA check: for instance the indication might be an Association Response frame indicating success. If the device 102 is not allowed to use the LAMA 204, then the message 208 may inform the device 102 that the device 102 is not allowed to connect to the network. The message might include greater detail, such as that connectivity is denied because of the choice of LAMA 204. The network administrator device 106 may include in the message 208 a set 210 of LAMAs to avoid (e.g., LAMAs that appear in the set 206 of reserved LAMAs) and/or a LAMA recommendation 212 that includes one or more LAMAs that the network administrator device 106 recommends for consideration (e.g., LAMAs that do not appear in the set 206 or reserved LAMAs). The set 210 of LAMAs to avoid may include any suitable number of LAMAs. For example, the set 210 may include one or more contiguous ranges of LAMAs that the device 102 should avoid. The LAMA recommendation 212 may include any suitable number of LAMAs. For example, the LAMA recommendation 212 may include one or more contiguous ranges of LAMAs that the device 102 may select from. These contiguous ranges may be indicated using a mask resembling a subnet mask.

The network administrator device 106 communicates the message 208 to the device 102 (e.g., through an access point 104) to instruct the device 102 as to which LAMAs to select from or avoid. The device 102 may analyze the set 210 of LAMAs to avoid or the LAMA recommendation 212 to determine which LAMA to select. In this manner, the network administrator device 106 prevents or handles LAMA conflicts in the system 100. In some embodiments, if the message 208 instructs the device 102 to select a different LAMA, then the access point 104 to which the device 102 is attempting to connect or associate may reject the connection or association from the device 102. The Association Response frame delivering the rejection might include a Status Code field or other field indicating that the selected LAMA is problematic (or might include no specific information at all: e.g., Status Code is set to REFUSED_REASON_UNSPECIFIED). The device 102 may then reconnect or re-associate after selecting a different LAMA (e.g., a different LAMA as recommended by the message 208).

Figure 3:
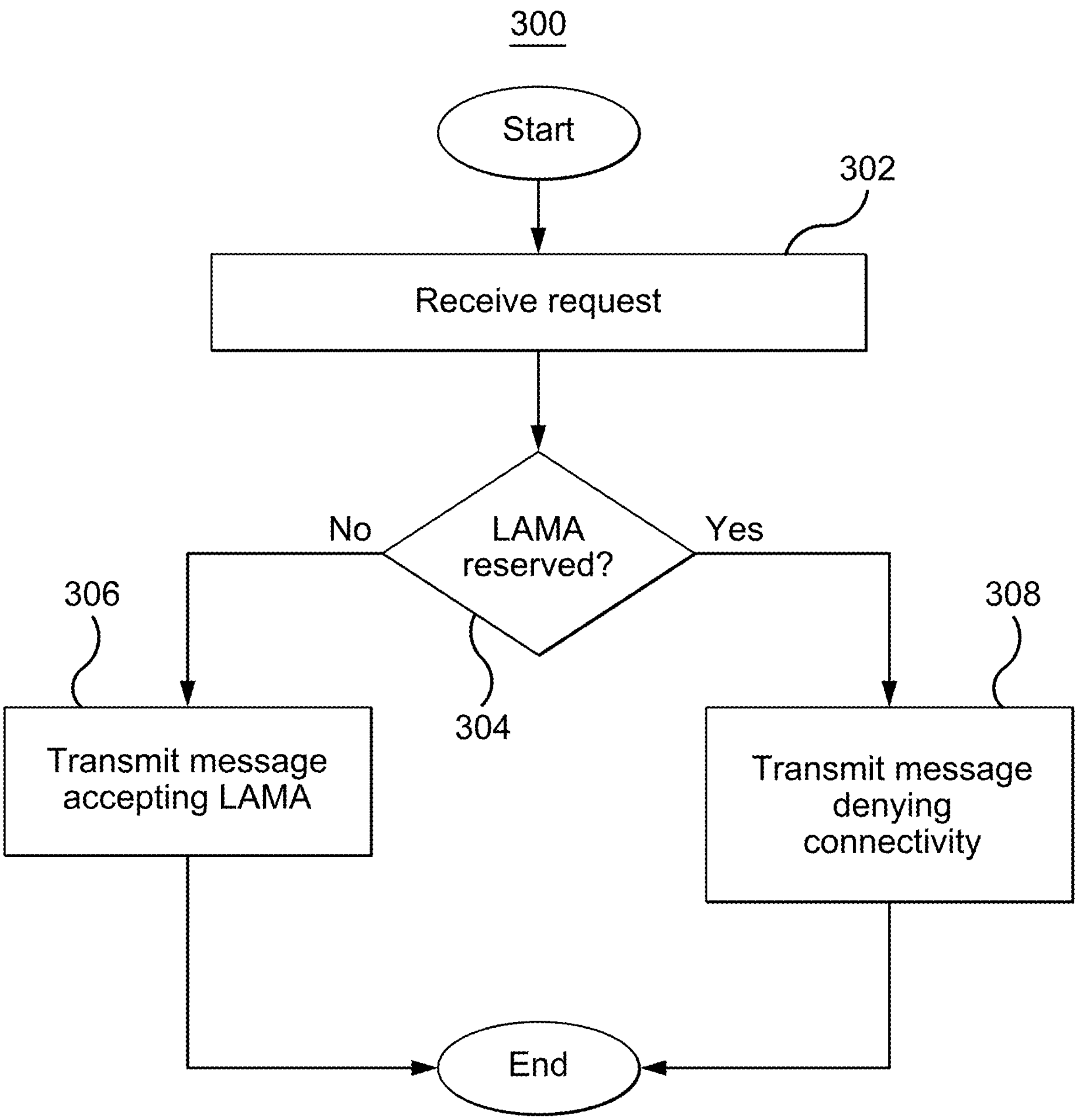
FIG. 3 is a flowchart of an example method performed in the system of FIG. 1.

FIG. 3 is a flowchart of an example method 300 performed in the system 100 of FIG. 1. In particular embodiment, the network administrator device 106 performs the method 300. By performing the method 300, the network administrator device 106 detects and avoids LAMA conflicts in the system 100.

In block 302, the network administrator device 106 receives a request 202. The request 202 may have been generated by a device 102 when the device 102 attempted to connect or associate with an access point 104 in the system 100. The request 202 may include a LAMA 204 that the device 102 is expecting or requesting to use.

In block 304, the network administrator device 106 determines whether the LAMA 204 in the request 202 is reserved. The network administrator device 106 may compare the requested LAMA 204 with a set 206 of reserved LAMAs. The set 206 of reserved LAMAs may include LAMAs that are already in use by other components in the system 100 (e.g., access points 104 or other devices 102) or LAMAs that are reserved for future use in the system 100. The network administrator device 106 may determine whether the requested LAMA 204 appears in the set 206 of reserved LAMAs. If the requested LAMA 204 does not appear in the set 206 of reserved LAMAs, then the network administrator device 106 may transmit a message 208 accepting the LAMA 204 in block 306. The network administrator device 106 may communicate the message 208 to the device 102. The device 102 may then connect or associate with the access point 104 using the requested LAMA 204. When the request to use a LAMA is present in an Authentication or (Re) Association Request frame, then a successful Authentication or (Re) Association Response frame may be the message 208; so, if the message 208 is a (Re) Association Response frame, then association is already implied.

If the requested LAMA 204 appears in the set 206 of reserved LAMAs, then the network administrator device 106 transmits a message 208 to the device 102 denying connectivity in block 308. The message 208 may indicate an unspecified failure, failure due to the LAMA 204, or failure with an instruction to select another LAMA. The message 208 may inform the device 102 that the requested LAMA 204 should not be used. In some embodiments, the message 208 may also include a set 210 of LAMAs to avoid when the device 102 selects a new LAMA. In certain embodiments, the message 208 may include a LAMA recommendation 212 that includes one or more LAMAs that the device 102 may choose from when the device 102 selects a new LAMA. In this manner, the message 208 may inform the device 102 of LAMAs to consider and LAMAs to avoid, when selecting a new LAMA. The access point 104 may reject the request to connect or associate from the device 102 if the device 102 is not allowed to use the LAMA 204. The device 102 may select a new LAMA according to the information in the message 208. The device 102 may then attempt to connect or associate again with the access point 104 using the new LAMA.

Figure 4:
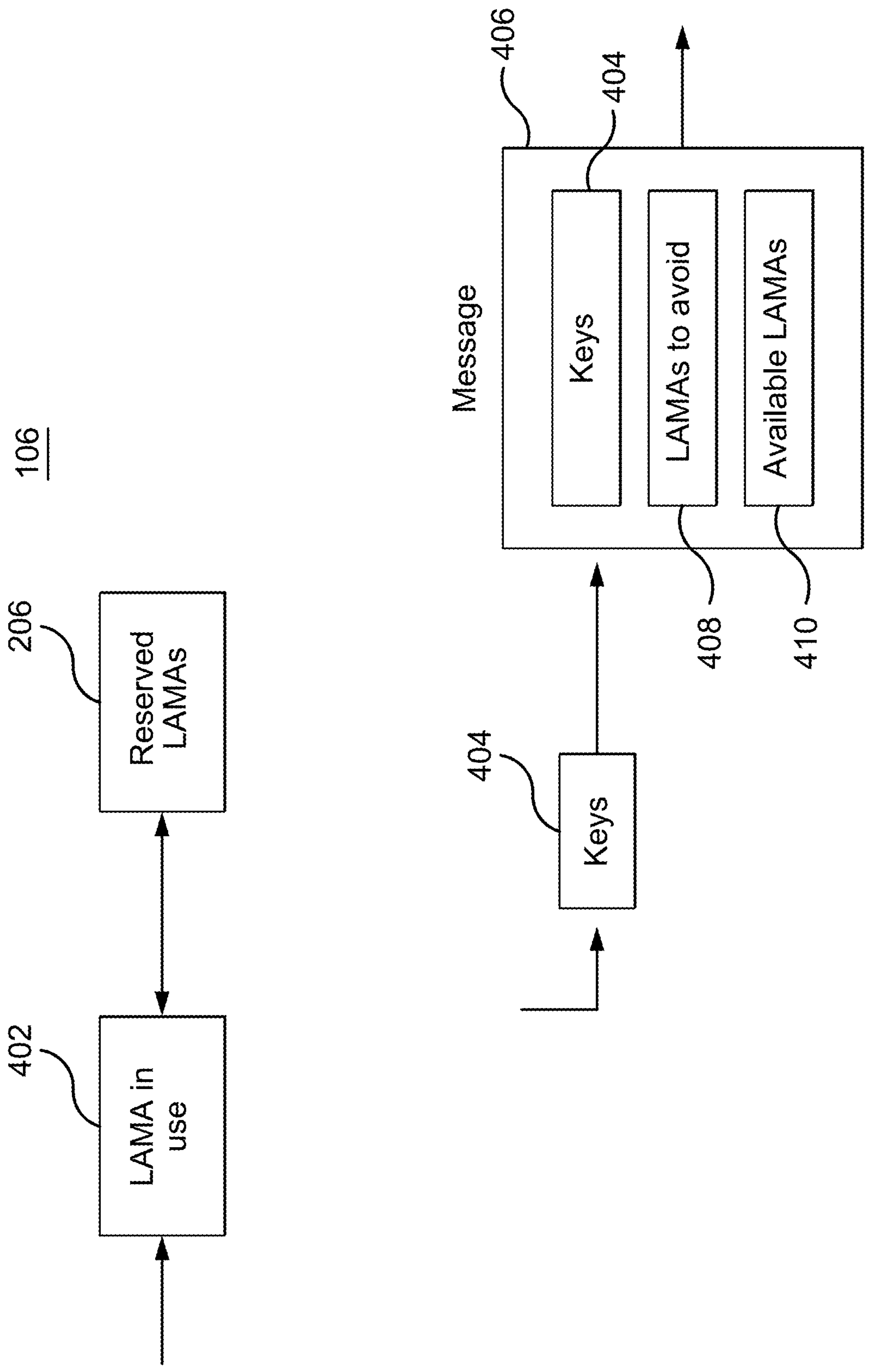
FIG. 4 illustrates an example network administrator device in the system of FIG. 1.

FIG. 4 illustrates an example network administrator device 106 in the system 100 of FIG. 1. As seen in FIG. 4, the network administrator device 106 receives a LAMA 402 that is in use by a device 102 in the system 100. The device 102 may be using the LAMA 402 while connected to an access point 104 in the system 100. The network administrator device 106 may compare the LAMA 402 to the set 206 of reserved LAMAs to determine whether the LAMA 402 will result in a conflict. For example, the network administrator device 106 may determine whether the LAMA 402 is in use or reserved for future use by an access point 104 to which the device 102 is not currently connected. The access point 104 may be in another section of the system 100 and out of range of the device 102. Thus, even though the LAMA 402 is not currently causing a LAMA conflict, a LAMA conflict may arise if the device 102 roams to the other access point 104 while maintaining use of the LAMA 402. For example, if the device 102 roams to the other access point 104 using any FT protocol or key caching protocol, in which the device 102 keeps or maintains the LAMA 402 when roaming to different access points 104, then the device 102 may cause a LAMA conflict to arise.

The network administrator device 106 may preemptively handle or prevent the LAMA conflict by instructing the device 102 to select a different LAMA. The device 102 may select a different LAMA and establish keys 404 for the newly selected LAMA. The device 102 may establish the keys 404 by performing any suitable protocol. For example, the device 102 may perform a four-way handshake to establish keys 404 for the newly selected LAMA. The device 102 may then use the keys 404 when roaming to different access points 104 to use the newly selected LAMA.

The network administrator device 106 may establish the keys 404 with the device 102. The network administrator device 106 may include the keys 404 in a message 406 that the network administrator device 106 communicates to the device 102. The message 406 may include a set 408 of LAMAs to avoid and a set 410 of available LAMAs to consider for use. In this manner, the message 406 may provide the keys 404 to the device 102, or the message 406 may inform the device 102 from which LAMAs that the device 102 may select. In some embodiments, the network administrator device 106 communicates the set 408 of LAMAs to avoid or the set 410 of LAMAs that are available for use in a separate message 406 from the message 406 used to communicate the keys 404. For example, the network administrator device 106 may first communicate the set 408 of LAMAs to avoid or the set 410 of LAMAs available for use to the device 102. After the device 102 selects a new LAMA, the network administrator device 106 may establish the keys 404 and communicate the keys 404 to the device 102. In some embodiments, the device 102 establishes the keys 404 with the network administrator device 106 (e.g., using a 4-way handshake) without the keys 404 being communicated over the air from the network administrator device 106 to the device 102, and vice versa.

In certain embodiments, the set 408 of LAMAs to avoid and the set 410 of available LAMAs are sent in an encrypted message (e.g., without the keys 404). In this manner, another device 102 may not be able to see or determines the LAMAs to avoid and the available LAMAs.

After the device 102 selects the new LAMA and establishes the keys 404, the device 102 may not transition to the newly selected LAMA until the device 102 roams or travels to another access point 104 in the system 100. When the device 102 roams or connects to another access point 104, the device 102 may transition to the newly selected LAMA. This roam may be the next roam or a later roam. The later roam may be triggered when the device 102 is nearby the access point 104 that reserved the LAMA. The device 102 may communicate the keys 404 to the access point 104 to use the newly selected LAMA. When the device 102 subsequently roams to another access point 104, the device 102 may keep or maintain the newly selected LAMA. In this manner, the network administrator device 106 preemptively handles or prevents the LAMA conflict from arising when the device 102 roams or travels to another access point 104 (e.g., another access point 104 in which the LAMA is in use or reserved for future use).

Figure 5:
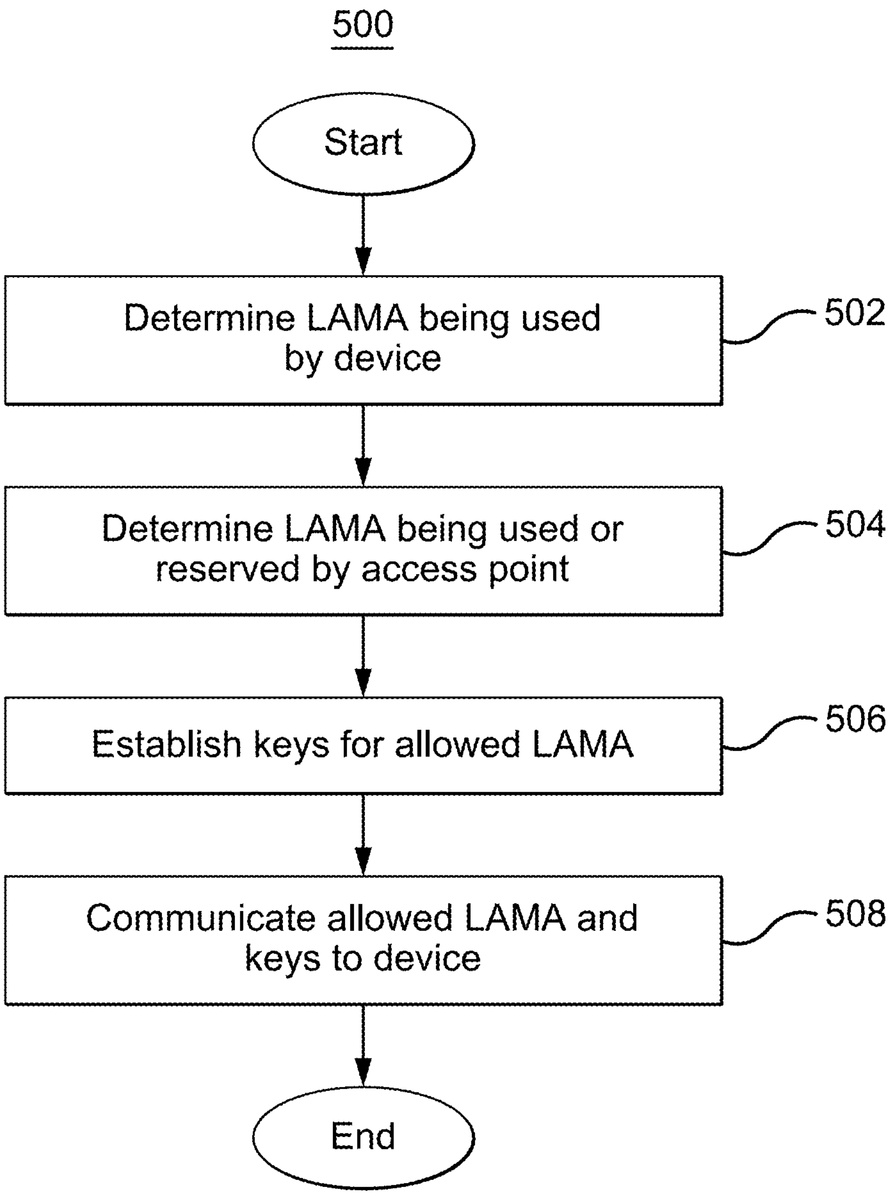
FIG. 5 is a flowchart of an example method performed in the system of FIG. 1.

FIG. 5 is a flowchart of an example method 500 performed in the system 100 of FIG. 1. In particular embodiments, the network administrator device 106 performs the method 500. By performing the method 500, the network administrator device 106 preemptively handles or prevents LAMA conflicts from arising in the system 100.

In block 502, the network administrator device 106 determines a LAMA 402 or multiple LAMAs 402 that are being used by a device 102. The device 102 may be using the LAMA 402 when connected or attempting to connect to a first access point 104 in the system 100. Using the LAMA 402 at the first access point 104 may not cause a LAMA conflict in the system 100, because no nearby devices 102 or access points 104 are using the LAMA 402 and no nearby access points 104 have reserved the LAMA 402 for future use.

At block 504, the network administrator device 106 determines that the LAMA 402 or multiple LAMAs 402 are being used or reserved for future use by an access point 104 that may be nearby yet was not detected by the device 102 or may not be nearby. This access point 104 may be located in another section of the system 100 and may be currently out-of-range of the device 102. The network administrator device 106 may determine that a LAMA 402 is being used or is reserved for use by determining that the LAMA 402 appears in a set 206 of reserved LAMAs. When the network administrator device 106 determines that the access point 104 is using or has reserved the LAMA 402, the network administrator device 106 may determine that a potential LAMA conflict could arise if the device 102 roams or connects to the access point 104 while maintaining the LAMA 402. In response, the network administrator device 106 may instruct the device 102 to select a new LAMA.

At block 506, the network administrator device 106 establishes keys 404 for the allowed LAMA. The network administrator device 106 may generate the keys 404 and communicate the keys 404 to the device 102. The device 102 may establish the keys 404 with the network administrator device 106 according to any suitable protocol (e.g., by performing a four-way handshake).

At block 508, the network administrator device 106 communicates the allowed LAMA and the keys 404 to the device 102. The device 102 may then use the allowed LAMA along with the keys 404 when the device 102 roams or connects to other access points 104 (e.g., an out-of-range access point 104). The device 102 may maintain the LAMA 402 until the device 102 roams or connects to another access point 104, either at the next roam/connection or a subsequent roam/connection. When the device 102 connects to a different access point 104, the device 102 may transition to the allowed LAMA, and use the keys 404 corresponding to the allowed LAMA with the new access point 104. In this manner, the network administrator device 106 prevents the device 102 from causing a LAMA conflict by instructing the device 102 to switch LAMAs when roaming or connecting to a different access point 104.

In summary, the system 100 includes a network administrator device 106 that determines when a client device 102 is using or requests to use a LAMA 204 that creates a conflict. For example, the system 100 may determine when the LAMA 204 is already in use or is reserved to be used in the future. When a conflict arises, the network administrator device 106 may instruct the client device 102 to select a different LAMA. For example, the network administrator device 106 may indicate to the client device 102 that a conflict exists and provide to the client device (i) one or more ranges of LAMAs to avoid when selecting a new LAMA and/or (ii) a LAMA, a range of LAMAs, or a set of ranges of LAMAs to choose from when selecting the new LAMA. The client device 102 may then select the new LAMA that will avoid the conflict.

The network administrator device 106 may detect that a LAMA conflict may arise between the client device 102 and an access point 104 that is currently out-of-range of the client device. The network administrator device 106 may prospectively handle this conflict by instructing the client device 102 to select a new LAMA before the client device 102 moves or roams to the access point 104. The network administrator device 106 may even recommend to the client device 102 one or more ranges of LAMAs to avoid because those LAMAs are in use or reserved for future use by the access point 104. In some embodiments, if the client device 102 is using a roaming or transition protocol that allows the client device 102 to keep its selected LAMA while moving or roaming between access points 104 (e.g., the 802.11r FT protocol), then the network administrator device 106 may have the client device 102 (*i*) select a new LAMA that avoids potential conflicts with out-of-range access points 104 and (ii) establish key(s) 404 for use with the new LAMA. In this manner, the client device 102 may have suitable key(s) 404 when moving or roaming to other access points 104 and beginning use of the new LAMA.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. An apparatus comprising:

a memory; and a processor communicatively coupled to the memory, the processor configured to:

receive a request for a client device to use a locally administered medium access control address (LAMA);

determine that the LAMA is in use or reserved for future use by an access point that is out of range of the client device; and prior to the client device roaming to the access point, transmit to the client device a message denying connectivity to the client device using the LAMA, wherein the message indicates a LAMA that the client device is prohibited from selecting.

2. The apparatus of claim 1, wherein the message instructs the client device to select another LAMA.

3. The apparatus of claim 2, wherein the message further indicates a range of LAMAs that the client device is prohibited from selecting.

4. The apparatus of claim 2, wherein the message further recommends a LAMA for the client device to use.

5. The apparatus of claim 2, wherein the message further recommends a range of LAMAs from which the client device selects a LAMA for use.

6. The apparatus of claim 1, wherein the LAMA indicated by the request falls within a contiguous range of LAMAs that are reserved for future use by the access point.

7. The apparatus of claim 1, wherein the request is a request to connect to the access point.

8. A method comprising:

receiving a request for a client device to use a locally administered medium access control address (LAMA);

determining that the LAMA is in use or reserved for future use by an access point that is out of range of the client device; and prior to the client device roaming to the access point, transmitting to the client device a message denying connectivity to the client device using the LAMA, wherein the message indicates a LAMA that the client device is prohibited from selecting.

9. The method of claim 8, wherein the message instructs the client device to select another LAMA.

10. The method of claim 9, wherein the message further indicates a range of LAMAs that the client device is prohibited from selecting.

11. The method of claim 9, wherein the message further recommends a LAMA for the client device to use.

12. The method of claim 9, wherein the message further recommends a range of LAMAs from which the client device selects a LAMA for use.

13. The method of claim 8, wherein the LAMA indicated by the request falls within a contiguous range of LAMAs that are reserved for future use by the first access point.

14. The method of claim 8, wherein the request is a request to connect to the access point.

* * * * *